March 17, 1959 — W. E. THORNTON-TRUMP — 2,877,618
SIDE MOUNT MOWER
Filed Jan. 2, 1957
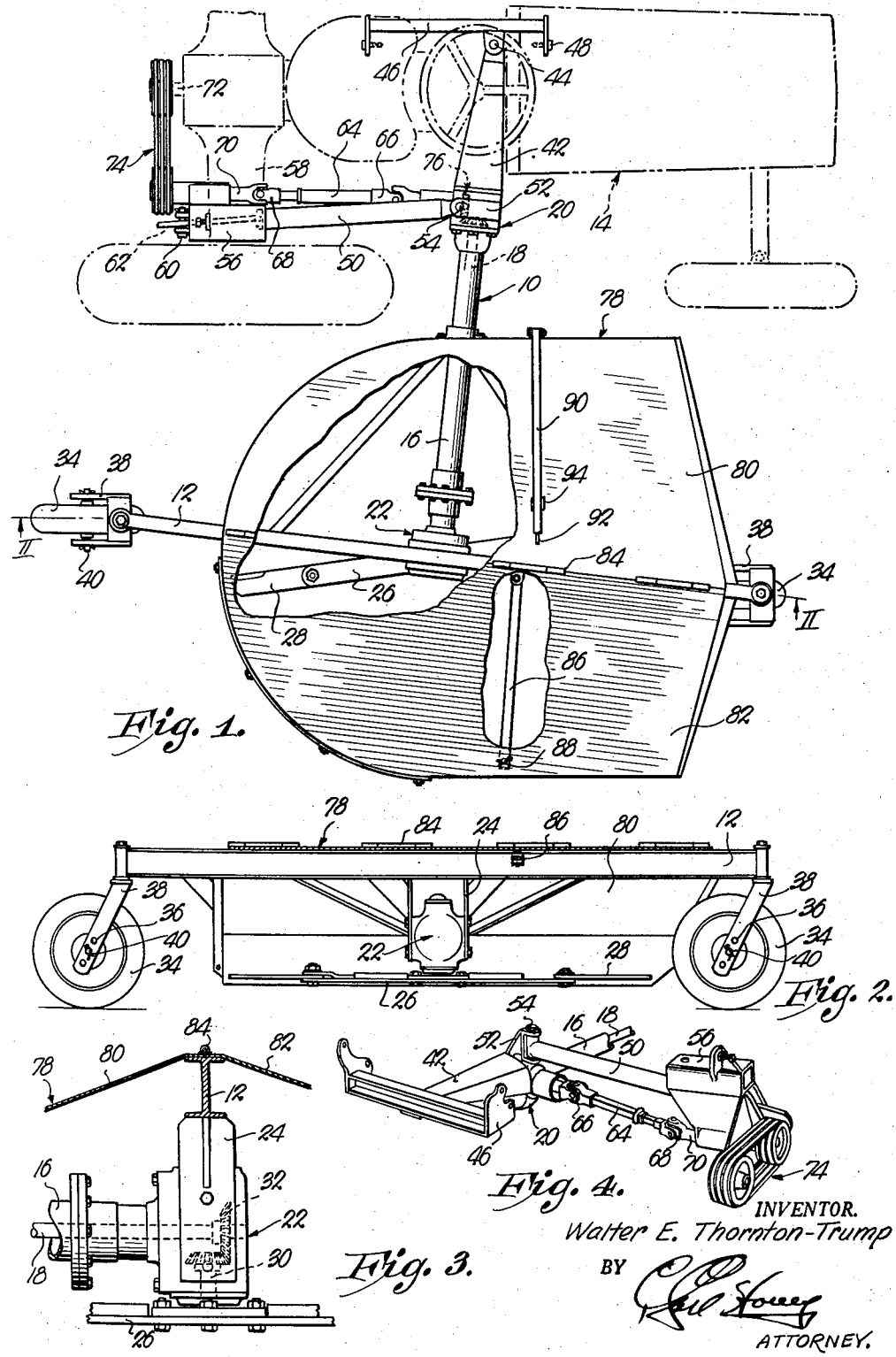
INVENTOR.
Walter E. Thornton-Trump
BY
ATTORNEY.

2,877,618
SIDE MOUNT MOWER

Walter E. Thornton-Trump, Oliver, British Columbia, Canada, assignor to Trump Engineers Ltd., Oliver, British Columbia, Canada Application January 2, 1957, Serial No. 632,108

4 Claims. (Cl. 56—25.4)

This invention relates to improvements in attachments for tractors, and particularly, to a side mount mower adapted for support, operation and advancement by the tractor to which the same is attached.

It is the primary object of the present invention to provide a tractor mounted mower that is especially adapted for use in orchards or in and about trees generally, not only by virtue of the inclusion of means to protect the trees against damage, but because of the relatively compact construction incorporated therein, all while maintaining a relatively large effective cutting area or swath width.

Another important object of the instant invention is to provide a mower that may be quickly and easily attached to a tractor alongside thereof and at the same time be easily and effectively coupled with the power take-off of the tractor at the rear of the latter to drive the cutter means of the mower.

A further object of the present invention is to provide a side mount mower that does not adversely effect the maneuverablity of the tractor because of the provision of strategically placed ground-engaging caster wheels cooperable with the tractor in supporting the mower.

A further object of the present invention is the provision of novel coupling means between the power take-off of the tractor and the cutter means permitting ready adjustment of the angularity of the mower with respect to the tractor.

A still further object of the instant invention is to provide a protecting hood for the mower that includes articulated sections which may be folded relatively, thereby reducing the breadth of the composite unit by virtue of arrangement of parts including the said caster wheels and the cutter means therebetween.

In the drawing:

Figure 1 is a plan view with parts broken away of a side mount mower made pursuant to my present invention showing the same operably connected to a tractor.

Fig. 2 is a cross-sectional view taken substantially on line II—II of Fig. 1.

Fig. 3 is a fragmentary view partially in elevation and partially in section showing the operable connection between the cutter means and the proximal drive shaft; and Fig. 4 is a perspective view showing the tractor attachment components and proximal parts of the drive from the tractor to the cutter means.

A frame, broadly designated by the numeral 10, is substantially T-shaped as best seen in Figure 1, including therefore, an elongated, normally horizontal beam 12 illustrated in Figure 1 at a slight angle to the normal path of travel of tractor 14.

Frame 10 includes additionally an elongated member 16 that interconnects the beam 12 and the tractor 14. Member 16 is tubular and, therefore, adapted to house a rotatable shaft 18 terminating at the ends thereof in gear boxes 20 and 22 respectively. The gear box 22 is disposed directly beneath beam 12 as seen in Figs. 2 and 3 and connected to the latter in suspended relationship thereto by suitable arms or brackets 24.

A rotatable cutter 26 beneath the gear box 22 is provided with swingable knives 28 at the outermost ends thereof and a vertical shaft 30 rotatably carried by the gear box 22. Gearing 32 within the box 22 operably interconnects the shafts 18 and 30.

The cutter means 26 is disposed between a pair of ground-engaging caster wheels 34 which support the beam 12, the height of the latter being adjustable by virtue of a plurality of openings 36 in yokes 38 for selectively receiving the axles 40 of the wheels 34.

An extension 42 for the member 16 and connected directly to the gear box 20, is attached to the tractor 14 through the medium of a vertical pivot pin 44 coupled with a bracket 46 that is in turn mounted on the tractor therebeneath by suitable fasteners 48. The frame 10 is additionally attached to tractor 14 through the medium of a member in the nature of an elongated link 50 extending rearwardly from the gear box 20. Through the medium of a yoke 52 and a pivot pin 54, the link 50 is swingably attached to the gear box 20 at the forward-most end of link 50.

A rear mount 56 adapted for releasable attachment to rear axle housing 58 of tractor 14 in any suitable manner not shown, receives the rearmost end of the link 50 through the medium of a fastener 60, the link 50 being provided with a plurality of spaced openings along near stretch 62 thereof selectively adapted to receive the fastener 60.

An extensible shaft 64 alongside the link 50 and provided with universal joints 66 and 68, extends rearwardly from gear box 20 and connects with a stub shaft 70. Power take-off shaft 72 of tractor 14 is connected with the stub shaft 70 by belt and pulley means 74. Intermeshing gears 76 within the gear box 22 interconnect shafts 18 and 64.

A hood 78 includes a pair of sections 80 and 82 that slope downwardly in opposite directions from the beam 12 as seen in Fig. 3, the sections 80 and 82 being interconnected along the beam 12 by hinge means 84. The hood section 80 is supported by the member 16 whereas the hood section 82 is normally supported by an arm 86 extending outwardly from the beam 12 to which it is pivotally attached.

A fastener 88 extending through the hood section 82 connects the latter with the outermost end of the arm 86. The hood section 80 swingably carries a rod 90 having a reduced terminal end 92 and normally held in place on the hood section 80 by a spring clip 94.

When the attachment is not in use and it is desired to decrease the breadth of the overall assembly, it is but necessary to remove the fastener 88, swing the arm 86 alongside the beam 12, align the cutting means 26 with the beam 12 and swing the hood 82 upwardly along hinge means 84. The terminal end 92 is inserted in the opening normally provided in hood section 82 for fastener 88, and the latter is employed to connect the hood section 82 with the rod 90 that has been swung upwardly out of its clip 94.

It is seen that in operation, cutting means 26 derives its power from the tractor 14, shaft 30 of the cutting means 26 being driven from power take-off 72 through belt and pulley means 74, shafts 70 and 64, gears 76, shaft 18 and gears 32.

The mower is supported in part by the caster wheels 34 and in part by the tractor 14 and by virtue of the fact that the wheels 34 are adapted to swivel freely about their vertical castering axes, the maneuverability of the tractor 14 is not adversely effected by virtue of the attachment of the mower thereto.

It is seen further that the angularity of the frame member 16 with respect to the tractor 14, may be varied simply by removing the fastener 60, swinging the member 16 about the pivot 44 and reinserting the fasteners 60 in another of the openings 62.

Such adjustment is made possible by virtue of the fact that the shaft 64 is extensible as aforementioned and further, because of the fact that the link 50 is provided with a pivotal connection 54 to the gear box 20. The unit is relatively low and by provision of the hood 78, it is possible to mow grass, weeds and prunings from beneath low-hanging branches and relatively close to the trunks of the trees, all without damage thereto.

So far as prunings are concerned, it has been found that the same may be permitted to gather beneath the trees and through use of the mower forming the subject matter of this invention, such prunings are shredded into relatively small pieces, eliminating the necessity therefore, of further handling of such prunings.

Having thus described the invention what is claimed as new and desired to be secured by Letters Patent is:

1. A side mount mower for use on a tractor having a power take-off, said mower comprising: a normally horizontal frame; connecting means at one extremity of the frame adapted for releasably attaching the latter to the tractor at one side thereof in laterally projecting relationship; front and rear caster-wheel means on the frame in spaced relationship to said connecting means and adapted to engage the ground; an elongated, substantially horizontal cutter blade; means mounting the blade on said frame for rotation below the latter on a substantially vertical axis disposed between said front and rear caster-wheel means and in spaced relationship to said connecting means; and drive means operably coupled with the blade and adapted for operable connection with the power take-off of the tractor.

2. A mower as set forth in claim 1 wherein said frame includes elongated, centrally disposed structure normally extending substantially longitudinally of the tractor and an elongated tubular member joined to and extending laterally from said structure, said connecting means being mounted on the outer end of said member remote from the structure and wherein said drive means includes a drive shaft rotatably mounted within the member and operably coupled to said blade.

3. A mower as set forth in claim 2 wherein said connecting means includes an elongated extension mounted on said outer end of the member in longitudinally extending alignment with the latter and adapted for pivotal connection at the end thereof remote from the member to the tractor, and an elongated link pivotally connected at one end thereof to said extension in spaced relationship to said end of the extension, extending laterally from the latter and adapted for connection adjacent the opposite end thereof to the tractor.

4. A mower as set forth in claim 3 wherein said drive means includes a gear box on each end respectively of the member and each coupled with a corresponding end of said drive shaft, and an extensible shaft having one end thereof operably coupled with the gear box adjacent said extension and the other end of the extensible shaft being adapted to be operably connected to said power take-off of the tractor, the gear box remote from said extension being operably coupled with said cutter blade.

References Cited in the file of this patent

UNITED STATES PATENTS

| | | |
|---|---|---|
| 1,710,749 | Savendsgaard | Apr. 30, 1929 |
| 1,787,677 | Guerin | Jan. 6, 1931 |
| 2,494,271 | Turner et al. | Jan. 10, 1950 |
| 2,684,564 | Schroeppel | July 27, 1953 |
| 2,697,319 | Porter | Dec. 21, 1954 |
| 2,709,881 | Goss | June 7, 1955 |
| 2,711,624 | Crump | June 28, 1955 |
| 2,726,502 | Hall | Dec. 13, 1955 |
| 2,757,504 | Elfes et al. | Aug. 7, 1956 |
| 2,763,977 | Spencer et al. | Sept. 25, 1956 |